July 27, 1948.  E. M. CALLENDER ET AL  2,446,125
CONTROL SYSTEM
Filed March 7, 1945
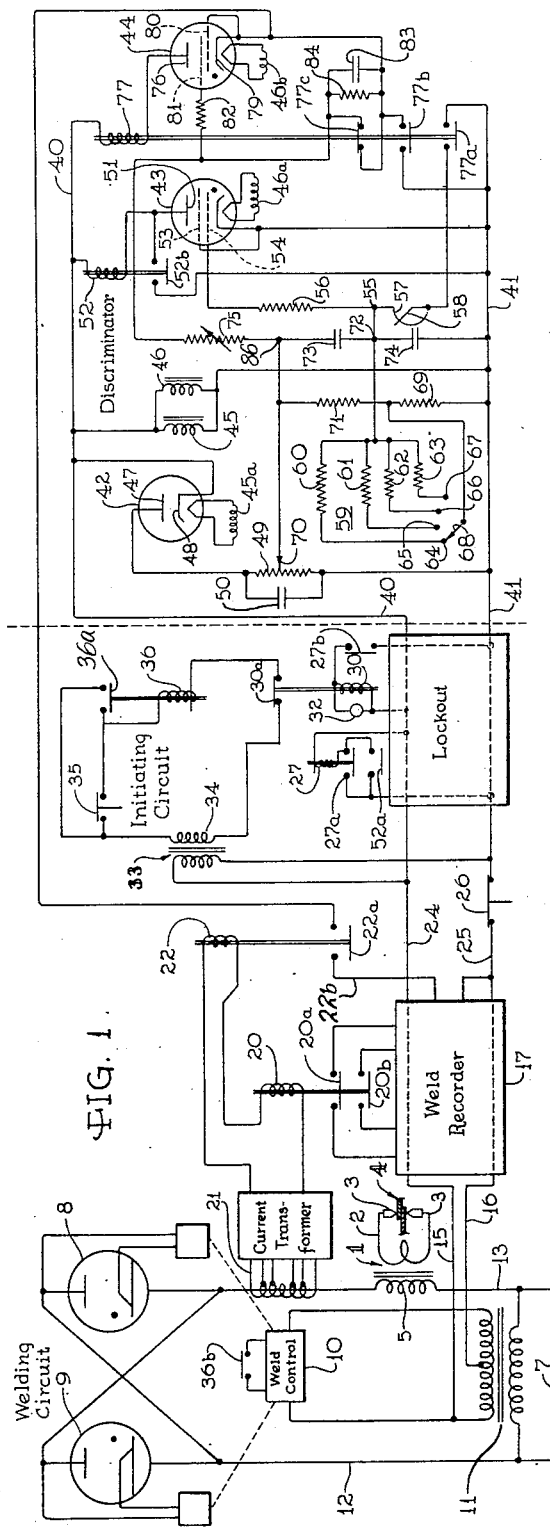
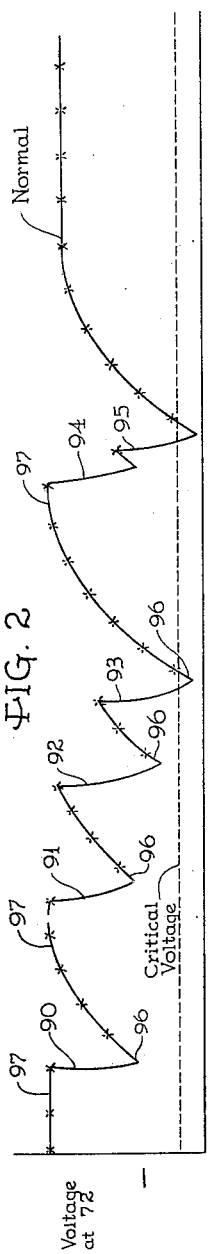
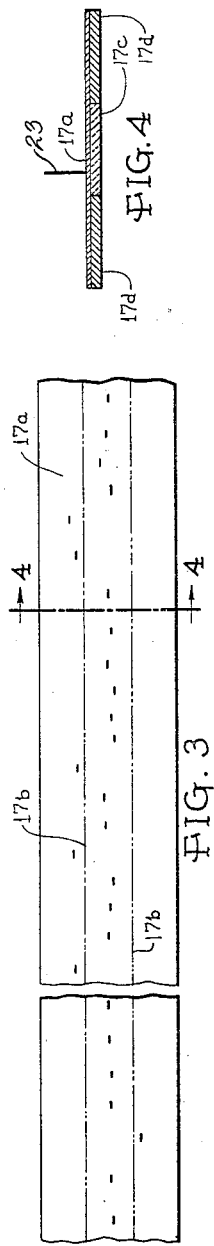
INVENTOR
Edwin M. Callender
Robert S. Phair
BY
John P. Tarbox
ATTORNEY

UNITED STATES PATENT OFFICE 2,446,125

CONTROL SYSTEM

Edwin M. Callender, Cynwyd, and Robert S. Phair, Philadelphia, Pa., assignors to The Budd Company, a corporation of Pennsylvania Application March 7, 1945, Serial No. 581,468

15 Claims. (Cl. 219—4)

This invention relates generally to power system controls such as may be used in welding. More particularly the invention relates to a control such as a lock-out or disconnecting means which may be associated with a welding circuit for disconnection of the same from the power source on the occurrence of deflective or abnormal welds as distinguished from good or normal welds.

Lock-out means are currently used in welding equipment which function on the occurrence of a single defective weld. Such means usually are associated with the so called weld recorder, this unit consisting of a moving strip of paper and related equipment which prints on the strip, a mark indicative of good or bad welds. Coincident with the imprint of a mark indicating a defective weld, an accessory lock-out circuit functions to prevent further welding until a manual switch is operated.

In high speed resistance welding of the type known as "shotwelding" where the defective welds are infrequent, the continued disconnection of the welding circuit results in considerable loss of time without any substantial advantage in the weld operation. For example, an occasional defective weld may occur due to an unusual condition affecting electrode pressure, contact resistance of the workpiece, or current variation which may not be directly related to the correctness of the general adjustment of the apparatus for good welds.

It is an object therefore of the invention to provide apparatus and associated circuits operative to lock-out the welding circuit only after a succession of two or more defective welds. Another object of the invention is to provide apparatus which will disconnect the weld circuit only when the defective welds occur within a predetermined number of welds. Still another object is to provide apparatus which may be adjusted to vary the number of consecutive defective welds at which time weld circuit disconnecting means will operate. Further objects will appear on consideration of the following description of the apparatus and of the drawings in which:

Figure 1 is a wiring diagram of the system;

Figure 2 is a curve showing variation of voltage at a control point in accordance with a sequence of good and bad welds;

Figure 3 is a conventional weld record strip, and

Figure 4 is a section through the strip and underlying support.

In Figure 1 is illustrated, diagrammatically, a welding system which may be roughly divided into the welding circuit, the weld control circuit, the weld recorder circuit, weld initiating circuit, the lock-out circuit and a discriminator circuit. Briefly stated, the welding circuit includes the power source, rectifying ignitrons and weld transformer and electrodes; the weld control circuit includes the timing and heat control mechanism; the weld recorder circuit includes means for indicating on tape whether or not the weld as made is good or defective; the weld initiating circuit includes means for manually initiating the welding sequence; the lock-out circuit provides means for opening the welding circuit in case of the occurrence of a defective weld; and the discriminator circuit distinguishes between the occurrence of a single isolated defective weld and a series of such welds, in the latter case, only permitting operation of the lock-out circuit to open the weld circuit.

Considering the system more in detail, the welding circuit includes a welding transformer 1 which is provided with a secondary 2 and terminal electrodes 3 adapted to engage a workpiece 4 for welding purposes. The primary 5 of the welding transformer is connected to alternating current power terminals 6 through a main two pole switch 7 and also through inversely connected ignitrons or mercury cooled gas power tubes 8 and 9. The anodes and igniters of these ignitrons are connected to the weld control circuit 10.

The weld control circuit 10 derives power from a transformer 11 across the power mains 12 and 13 and is utilized to secure an automatic timing of the period during which welding current flows in the circuit. In addition, this circuit is devised to control the amount of heat energy supplied the weld. Operation of the weld control is initiated by closure of the contact switch 36b connected thereto and actuated by a relay in the initiating circuit as will be more clearly described hereinafter.

The weld recorder circuit is energized by alternating current as derived from the welding circuit transformer 11, the conductors 15 and 16 forming the power lines. The weld recorder is of conventional construction such as described on pages 235, 236 of the publication Electronic Control of Resistance Welding, by George M. Chute, and in publications of the General Electric Company such as CR7503–A141—Thyratron Spot Welding Control Panel With Ampere Squared-Second Recorder. This recorder is provided with a traveling paper tape 17a (Fig. 3) with limiting boundary lines 17b thereon and on which when a weld occurs a printed mark is made. If the weld is good the mark appears between the boundary lines, but if the weld is defective the print appears external to these lines. A motorized needle 23 with amplitude of swing depending upon the square of the current and time is the marking agent. When this needle contacts in a normal range, insulation 17c (Fig. 4) beneath the paper prevents a circuit forming, of which the needle is a part. However, outside of the normal range metal plates 17d beneath the paper permits contacts with the needle to close an electrical circuit energizing the lock-out apparatus. The details of the weld recorder 17 have not been shown in the drawing as unnecessary to the disclosure; but as related to the operation the interconnected contact switches 20a and 20b are indicated to be operated by the relay coil 20. Closure of these switches causes the weld recorder to function.

Any appropriate means for energizing the relay of switches 20a and 20b may be used but there is illustrated a conventional means in the current transformer 21 related to the power circuit as shown and including also the relay coil 22 which operates the needle 23, and in the case of defective welds completes a circuit through contact switch 22a of the recorder unit. Accordingly it is apparent that the recorder, with the associated needle contact functions only when welding current flows in the welding circuit.

The lock-out circuit is directly connected to the weld recorder circuit. For the most part this circuit is conventional in its component parts, as appears from the publications hereinabove referred to. Power is applied to the lock-out circuits by conductors 24 and 25 which may be in extension of conductors 15 and 16, a normally closed push button 26 manually operated and functioning as a reset switch being placed in the conductor 25. As previously stated, the lock-out circuit operates to open the welding circuit ordinarily on closure of recorder needle 23 with one of the metal plates 17d when an improper weld is made. This weld may be defective because of insufficient current or because of an excessive amount of current, in either case the mark of the weld appearing outside the boundaries 17b of normal welds. The lock-out unit includes relay coil 27 which is shown external to the boxed unit and indicated as connected across the power conductors and in series with two parallel switches, one, numbered 27a, being a lock switch for the coil of relay 27 and being actuated by the relay 27 and the other switch 52a being operated independently by a relay 52 in the discriminator circuit. Closure of switch 52a energizes relay 27 to lock-in switch 27a to carry out the functioning of the circuit. A second relay 30 is also shown in connection with the lock-out unit, this relay being in series with a normally open contact switch 27b actuated by the relay 27 and in parallel with a bell 32 or other indicating device. Energization of relay 30 by closure of switch 27b opens a normally closed switch 30a in the circuit of relay 36 in the initiating circuit next to be described.

The initiating circuit is electrically associated with the lock-out circuit and affords means for manually initiating the welding sequence and for preventing resumption of the welding operation after a lock-out has occurred. The initiating circuit is energized through a transformer 33 from the power conductors 24 and 25, it being observed that connection to the conductor 25 is made on the side of the reset switch 26 away from the power source. The secondary 34 of the transformer 33 is connected in series with the manual initiating switch 35, relay coil 36 and switch 30a.

A lock-in switch 36a for relay 36 by-passes the initiating switch 35. The switch 36a is closed when the relay 36 is energized.

The discriminator circuit remains to be described. This circuit is electrically associated with the lock-out circuit and is intended to modify the action of the lock-out circuit so that this circuit will not function on a single defective weld signal but only on two or more of such signals. The power lines 24 and 25 are extended as conductors 40 and 41 from the lock-out circuit. Across these conductors is placed a rectifier tube 42 and two thyratrons of the shield grid type 43 and 44. The filaments of each of these tubes is heated by power from the transformer 45 and 46 also connected across these conductors, the secondaries 45a, 46a and 46b being indicated.

The rectifier circuit includes in addition to the rectifier tube 42 with the anode 47 and cathode 48, a resistor 49 by-passed by a capacitor 50. The thyratron 43 has an anode 51 connected to the conductor 40 with a relay coil 52 in series. The cathode of the tube 43 is connected directly to the conductor 41. The screen grid 53 is connected to the cathode of the tube and the control grid 54 is connected through a resistance network and contact switch 77a to the conductor 41. The resistance elements of the network just mentioned include a resistor 56 and a variable resistor 57 having a movable contact 58, these resistors being in series with the contact switch 77a. At a point 55 intermediate the resistors 56 and 57 connection is made to a resistor group 59 including a plurality of parallel resistors 60, 61, 62 and 63. The other end of these resistors forming this unit are connected to terminals 64, 65, 66 and 67 to which a movable contact arm 68 is adapted for engagement. The contact arm in turn is connected to the conductor 41 through a resistor 69 and to a movable contact point 70 engaging the resistor 49 through a second resistor 71. The resistor 69 has a resistance substantially in excess of that of the resistance 71, a workable relationship being in approximately 30 megohms for resistor 69 and 5 megohms for resistor 71. The movable contact 70 and the resistor 71 are also connected to a point 72 between point 55 and the resistor group 59, through a capacitor 73. This point 72 is also connected through a capacitor 74 to the conductor 41. Preferably capacitor 73 should have a capacitance substantially in excess of capacitor 74.

It is pointed out that the relay 52 is adapted to actuate a coil lock-in switch 52b in a branch circuit connected between the anode 51 of tube 43 and the conductor 41 whereby the tube may be short circuited. This relay also actuates the switch 52a in the lock-out circuit.

The anode 76 of tube 44 is similarly connected through a relay coil 77 to the conductor 40. This relay is adapted to actuate the switch 77a in the circuit of control grid 54 of tube 43 and also a contact switch 77b in the circuit of the cathode 79 of tube 44 to conductor 41. The control grid 80 of tube 44 is connected to the tube cathode 79. The screen grid 81 of the tube is connected through a resistor 82 to the tube cathode, through a parallel grouping of a capacitor 83, a resistor 84 and a normally closed contact switch 77c actuated by relay 77. The screen grid 81 is also connected through the resistor 82 and variable resistor 75 to a point 86 intermediate the capacitor 73 and the resistor 71.

Relay coils 52 and 77 are shaded to produce a 90° flux lag so that the coils, when energized, retain the armatures in attracted position throughout a complete alternating current cycle.

The operation of the system may now be described. Prior to a welding operation the main switch 7 is closed, conditioning the welding circuit for energization, activating the filament transformers 45 and 46 of the discriminator circuit and developing a pronounced negative bias on the grid 81 of tube 44 as the result of current flow through the rectifier tube 42. It is pointed out that the slider 70 of resistance 49 and variable resistor 75 may be adjusted to predetermine the degree of bias on the grid 81 of the tube 44, the requirement being that the grid 81 be sufficiently negative to block current flow through the tube 44. The operator next closes the initiating switch 35 in the initiating circuit. Immediately, energy supplied by the transformer 33 energizes relay 36 through closed switch 30a to close switch 36a and thereby lock in the relay circuit past the switch 35. Simultaneously switch 36b in the welding control circuit is closed by relay 36, initiating the welding cycle and at the same time energizing relays 20 and 22 in the weld recorder circuit. If a normal weld occurs, the weld recorder will make the usual mark for a good weld on the tape indicator and the branch circuit 22 including contact switch 22a will not be energized. Consequently the lock-out circuit will not function and upon completion of the weld cycle additional welds may be made.

Should, however, a defective weld be made the circuit through contact switch 22a will be closed, thus connecting the cathode 79 of discriminator tube 44 to conductor 25, making the cathode 79 and grid 80 more negative than grid 81. At the same time the grid 81 of tube 44 is connected through normally closed switch 77c to conductor 25 to discharge its negative bias and the tube strikes, energizing relay 77 to open switch 77c and close switches 77a and 77b. Closure of switch 77b locks in the relay coil 77 through the tube 44 through which current continues to flow because of ionization, but opening of switch 77c permits the re-establishment of the blocking bias of grid 81, and closure of switch 77a initiates the sequence tending towards the discharge of grid 54 and actuation of relay 52 and the opening of the welding circuit.

If the point 72 in the resistor capacitor network of the control grid 54 of tube 43 be now considered, closure of switch 77a permits discharge of capacitors 73, 74 through point 72 and variable resistor 57 toward zero or ground voltage of conductor 41. The declination takes the usual form as indicated by section 90 of Figure 2 being substantially logarithmic, the rate of decline depending on the resistor 57 for any given voltage. Since the closure of switch 77a is accompanied by the opening of switch 77c, grid 81 rapidly develops a negative potential, blocking tube 44, deenergizing relay 77, and opening switch 77a. Thereupon point 72 potential begins to rise through increment of charge on capacitors 73, 74 through variable resistor network 59 until it assumes the voltage for normal good weld operation.

The resistor 57 is so adjusted that a single bad weld will not cause tube 43 to strike. However, if two consecutive bad welds occur as at 94, 95 of Figure 2, tube 43 will strike. The tube will strike also if two or more bad welds occur interspersed with good welds, provided the bad welds occur at sub-normal voltage on grid 54 and point 72. This is illustrated at sections 91, 92, 93 of Figure 2. In case a single bad weld occurs in a long sequence of good welds, the point 72 returns to normal as shown at 97 in Figure 2.

When tube 43 strikes due to movement of bias of control grid 54 above the critical point, current energizes relay 52, which in turn actuates switch 52a of the lock-out circuit, energizing relay 27 which closes its own switch 27a and its switch 27b. Thereupon, bell 32 is sounded and relay 30 is energized to open switch 30a of the initiating circuit. This deenergizes relay 36 and weld control contact 36b opens the weld circuit. At the same time lock-in switch 36a of relay 36 opens, making it impossible to initiate a new welding cycle by switch 35 until reset switch 26 is opened to release the lock-out circuit relay 27.

It is thus apparent that we have provided effective means for preventing lock-out on a single faulty weld without disturbing lock-out on two or more bad welds. It is apparent also that by adjustment of resistors 57, 75, and network 59, the number of faulty welds producing lock-out in a given time sequence of welds may be varied at will.

While the control has been described as applied to the lock-out of welding means it is evident that it may also be used independently of the power supplying the load but to operate a separate circuit or apparatus. The invention therefore is not limited to the illustrative disclosure but may include all modifications coming within the scope of the subjoined claims.

What is claimed is:

1. In a power system, welding means for producing a series of welds, means for supplying power to said welding means, and means for preventing connection of said power means to said welding means only after completion of at least two defective welds in said series, said connection-preventing means comprising a relay switch, a relay for operating said switch, an electronic tube circuit including said relay, said tube having a control grid, a capacitor connected to said grid and normally biased to tube cut-off for good welds, and means for changing the capacitor potential to the grid striking point on close recurrence of a defective weld by said welding means whereby said relay is energized to actuate said relay switch.

2. In a power system, welding means for producing a series of welds, means for supplying power to said welding means, first means for preventing connection of said power means to said welding means only after completion of at least two defective welds in said series, and second means for changing the minimum number of welds in excess of one at which said first means becomes operative to prevent connection of the power means to the welding means.

3. In a power system, welding means for producing a series of welds, means for supplying power to said welding means, relay switch means for establishing a disconnection of said power means, and means for actuating said relay switch means only after at least two consecutive defective welds in series, said actuating means comprising a relay coil, an electronic tube having a control grid therein connected in series with said coil across said power means, means for maintaining a cut-off voltage on said grid during a succession of good welds of the welding means, and means for impressing a striking voltage on said grid on occurrence of at least two consecutive defective welds in series whereby said relay coil is energized to activate said relay switch means.

4. In a power system, welding means for producing a series of welds, means for supplying power to said welding means, means for preventing connection of said power means to said welding means only after completion of at least two defective welds in said series, means for predetermining the number of consecutive defective welds effective to prevent connection of the power means, and means for maintaining the continuity of power supply to the welding means in a sequence of normal welds.

5. In a power system, welding means for producing a series of welds, means for supplying power to said welding means, means including a capacitor for preventing connection of said power means to said welding means, means for actuating said connection-preventing means on completion of at least two bad welds, and means comprising a variable resistor connected in series with said capacitor for predetermining the number of good welds between succeeding bad welds effective to prevent actuation of the connection-preventing means.

6. In a power system, a load circuit subject to a series of normal and abnormal recurrent loads, means for supplying power to said load circuit, means including a capacitor connected to said power supply means for preventing connection of the power means to the load circuit only on the occurrence of at least two consecutive abnormal loads, and means including a resistor connected to said capacitor for predetermining the number of defective loads in said series of loads operative to actuate said connection-preventing means.

7. In a power system, a load circuit subject to a series of normal and abnormal recurrent loads, means for supplying power to said load circuit, means for preventing connection of the power means to the load circuit only on the occurrence of at least two abnormal loads, means for changing the total number of recurrent normal loads between two abnormal loads operating to prevent establishment of disconnection of the power means, and means for maintaining the continuity of power supply to the load circuit in a sequence of normal loads.

8. In a power system, a load circuit subject to a series of normal and abnormal recurrent loads, means for supplying power to said load circuit, means for preventing connection of the power means to the load circuit only on the occurrence of at least two consecutive abnormal loads, means for predetermining the number of consecutive abnormal loads effective to prevent connection of the power means to the load circuit, and means for maintaining the continuity of power supply to the load circuit in a sequence of normal loads.

9. In a welding system, welding means for producing a series of welds, means for supplying power to said welding means, means for indicating defective welds, relay switch means for preventing connection of said power means to said welding means, and means for making said connection-preventing means effective only after at least two defective weld indications, said connection-preventing means comprising a relay coil, an electronic tube having a control grid therein connected to said coil across said power means, a capacitor connected to said control grid, means for maintaining a cut-off voltage on said capacitor during a succession of good welds of the welding means, and means for impressing a striking voltage on said capacitor on occurrence of at least two defective welds in series whereby said relay coil is energized to activate said relay switch means.

10. In a power system, welding means for producing a series of welds, means for supplying power to said welding means, means for preventing connection of said power means to said welding means, and means for actuating said connection-preventing means, said means comprising a relay operatively connected to said disconnecting means, a capacitor connected to said relay and subject to charge depletion on the occurrence of a defective weld, means for energizing said relay coincident with a critical state of capacitor depletion including an electronic tube having a control grid, means for impressing the capacitor charge voltage on said grid whereby the tube and relay are energized on capacitor charge depletion, and means including a variable resistor connected to said capacitor for preventing capacitor depletion to the critical state on less than two consecutive defective welds.

11. In a power system, welding means for producing a series of welds, means for supplying power to said welding means, and means for preventing connection of said power means to said welding means, said connection-preventing means comprising a relay, a capacitor connected to said relay and subject to charge change on the occurrence of a defective weld, means for energizing said relay coincident with a critical state of capacitor change including an electronic tube having a control grid, means for impressing the capacitor charge voltage on said grid whereby the tube and relay are energized on capacitor charge change, and means including a variable resistor connected to said capacitor for preventing capacitor change to the critical state on less than two consecutive defective welds.

12. In a power system, welding means for producing a series of welds, means for supplying power to said welding means, means for preventing connection of said power means to said welding means, a capacitor, means for charging said capacitor to full capacity during maintenance of normal good welds in series, means for discharging said capacitor on occurrence of defective welds, and means connected to said capacitor for actuating said power connection-preventing means on production of adjacent successive defective welds by said welding means.

13. In a control circuit applicable to welding systems, a weld circuit subject to normal and abnormal welds, an initiating circuit including a power initiating relay and a relay switch, a first relay adapted to open said initiating circuit relay switch, a first grid-containing thermionic tube connected to said first relay, a capacitor connected to the grid of said first tube subject to a normal charge during occurrence of normal welds and operative to activate said first tube on capacitor discharge to a predetermined voltage, a second relay, a second grid-containing thermionic tube connected to said second relay, means dependent on occurrence of an abnormal weld for making said second tube and relay conductive and for discharging said capacitor, resistance means for controlling the rate of discharge of said capacitor on occurrence of an abnormal weld, resistance means for fixing the time period of current flow in said second tube and relay in excess of the time of a single weld, and resistance means for controlling the rate of charge of said capacitor after an abnormal weld, said initiating circuit relay switch being opened on discharge of said capacitor to the operating bias voltage of said first tube grid.

14. In a control circuit applicable to welding systems, a weld circuit subject to normal and abnormal welds, an initiating circuit including a power initiating relay and a relay switch, a first relay adapted to open said initiating circuit relay switch, a first grid-containing thermionic tube connected to said first relay, a capacitor connected to the grid of said first tube subject to a normal charge during occurrence of normal welds and operative to activate said first tube on capacitor discharge to a predetermined voltage, a normally open relay switch in the capacitor discharge circuit, a second relay for closing said capacitor relay switch, a second electronic tube for energizing said second relay, a switch device for initiating the flow of current through said second tube and relay on occurrence of a defective weld, and resistor means for timing the energization of said second tube within a period short of that necessary to secure energization of the first relay on occurrence of a single defective weld.

15. In a power system, welding means for producing a series of welds, means for supplying power to said welding means, means for connecting and disconnecting said power and welding means including an initiating circuit, and control means for preventing reconnection of the power and welding means after occurrence of at least two defective welds in close succession, said control means comprising a relay switch in said initiating circuit, a first relay for opening said switch, a capacitor connected in said control means having a normal charge during normal weld action but subject to charge depletion on occurrence of a defective weld, means for partially discharging said capacitor on occurrence of a single abnormal weld, means for controlling the rate of capacitor discharge, means for recharging the capacitor succeeding an abnormal weld, and an electronic tube connected in series with said first relay and having a grid connected to said capacitor and variable in voltage therewith, said tube on capacitor discharge to a predetermined voltage operating to energize said first relay to open said initiating circuit relay.

EDWIN M. CALLENDER.
ROBERT S. PHAIR.

REFERENCES CITED

The following references are of record in the file of this patent:

UNITED STATES PATENTS

| Number | Name | Date |
| --- | --- | --- |
| 1,787,181 | Traver | Dec. 30, 1930 |
| 1,941,511 | St. C. Seese | Jan. 2, 1934 |
| 2,007,371 | Hopkins et al. | July 9, 1935 |
| 2,007,587 | Wells | July 9, 1935 |
| 2,264,067 | Chambers | Nov. 25, 1941 |